(12) United States Patent
Barned et al.

(10) Patent No.: US 11,148,381 B2
(45) Date of Patent: Oct. 19, 2021

(54) METHODS FOR MANUFACTURING A TREAD FOR AGRICULTURAL TIRE USING A DINITRILE OXIDE CURE SYSTEM

(71) Applicant: Bridgestone Americas Tire Operations, LLC, Nashville, TN (US)

(72) Inventors: Robert Barned, Akron, OH (US); Joshua Abell, Franklin, TN (US); David Bender, Muscatine, IA (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 513 days.

(21) Appl. No.: 15/753,810

(22) PCT Filed: Aug. 22, 2016

(86) PCT No.: PCT/US2016/048017
§ 371 (c)(1),
(2) Date: Feb. 20, 2018

(87) PCT Pub. No.: WO2017/031492
PCT Pub. Date: Feb. 23, 2017

(65) Prior Publication Data
US 2019/0009489 A1  Jan. 10, 2019

Related U.S. Application Data

(60) Provisional application No. 62/207,505, filed on Aug. 20, 2015.

(51) Int. Cl.
*B29D 30/56* (2006.01)
*B60C 11/02* (2006.01)
(Continued)

(52) U.S. Cl.
CPC ......... *B29D 30/56* (2013.01); *B29D 30/0681* (2013.01); *B29D 30/54* (2013.01);
(Continued)

(58) Field of Classification Search
CPC ...... B29D 30/54; B29D 30/56; B29D 30/542; B29D 2030/544; B29D 2030/545
See application file for complete search history.

(56) References Cited

U.S. PATENT DOCUMENTS 3,945,417 A * 3/1976 Harrelson, Jr. ........ B29D 30/54
152/209.6
3,993,521 A  11/1976 Harrelson, Jr.
(Continued)

FOREIGN PATENT DOCUMENTS

EP  0941264 B1  7/2001
GB  2234718 A *  2/1991
(Continued)

OTHER PUBLICATIONS

Machine translation for Japan 2013-095097 (Year: 2019).*
(Continued)

*Primary Examiner* — Steven D Maki
(74) *Attorney, Agent, or Firm* — Meredith E. Hooker; Arthur M. Reginelli (57) ABSTRACT

A method of manufacturing a tread for agricultural tires, the method comprising providing an agricultural tire casing, providing a cured rubber component having first and second planar surfaces, providing a plurality of cushion gums, wherein the plurality of cushion gums contains a cure system comprising a stable dinitrile oxide compound, providing a plurality of lugs, and forming an agricultural tread composite by mating the lugs to a planar surface of the cured rubber component using the cushion gum.

12 Claims, 2 Drawing Sheets

(51) Int. Cl.
- *B60C 11/00* (2006.01)
- *B60C 1/00* (2006.01)
- *B29D 30/54* (2006.01)
- *C08K 5/00* (2006.01)
- *C08L 7/00* (2006.01)
- *C08L 9/00* (2006.01)
- *B29D 30/06* (2006.01)
- *C08K 5/32* (2006.01)

(52) U.S. Cl.
CPC .............. *B29D 30/542* (2013.01); *B60C 1/00* (2013.01); *B60C 1/0016* (2013.01); *B60C 11/005* (2013.01); *B60C 11/02* (2013.01); *C08K 5/00* (2013.01); *C08K 5/32* (2013.01); *C08L 7/00* (2013.01); *C08L 9/00* (2013.01); *B29D 2030/544* (2013.01); *B29D 2030/545* (2013.01); *B60C 2200/08* (2013.01)

(56) References Cited

U.S. PATENT DOCUMENTS

| | | | | |
|---|---|---|---|---|
| 4,240,851 A | * | 12/1980 | King | B29D 30/56 156/112 |
| 5,342,473 A | * | 8/1994 | Bibona | B29C 48/08 156/394.1 |
| 6,355,826 B1 | * | 3/2002 | Parker | C07C 291/06 558/299 |
| 2003/0089438 A1 | | 5/2003 | Sandstrom et al. | |
| 2012/0196976 A1 | * | 8/2012 | Araujo Da Silva | B29C 73/10 524/573 |
| 2013/0087259 A1 | * | 4/2013 | Mancini | B29D 30/52 152/209.1 |
| 2014/0008005 A1 | * | 1/2014 | Hara | B29D 30/542 156/128.1 |
| 2015/0107734 A1 | | 4/2015 | Rey et al. | |

FOREIGN PATENT DOCUMENTS

| | | | |
|---|---|---|---|
| JP | 2007-0040460 A | * | 4/2007 |
| JP | 2012-522088 A | | 9/2012 |
| JP | 2013-095097 A | * | 5/2013 |

OTHER PUBLICATIONS

Machine translation for Korea 2007-0040460 (Year: 2020).*
Derwent Abstract for Korea 2007-0040460 (Year: 2020).*
International Search Report for Application No. PCT/US2016/048017 dated Nov. 18, 2016.

* cited by examiner

METHODS FOR MANUFACTURING A TREAD FOR AGRICULTURAL TIRE USING A DINITRILE OXIDE CURE SYSTEM

FIELD OF THE INVENTION

Embodiments of the invention relate to methods for the manufacture of treads for agricultural tires. According to one or more embodiments, the method includes applying lugs to a tire tread substrate by using a cushion gum that includes a stable dinitrile oxide compound.

BACKGROUND OF THE INVENTION

Agricultural tires are tires used to travel on soft soil, such as fields, and not hard roads. Further, agricultural tires have a lug pattern tread shape and are inflated at a lower pressure than passenger car tires in order to generate traction and move forward by penetrating soft soil.

Traditionally, agricultural tires are created in a similar way to normal passenger car tires. Simply stated, the process of making a tire begins with a tire carcass, then a cured rubber component, also known as a tread component, is attached to the tire carcass by various known methods, and then the tire carcass and the tread component are cured, and a tire is formed.

Methods of retreading tires are used to extend the life of tires. By applying a new tread to a used tire casing, the life of the tire casing is extended. Retreaded tires often have to meet the same stringent quality standards as new tires and they additionally offer an economical and environmentally friendly alternative to new tires. Agricultural tires are able to go through a retreading process when available because it provides an economical way to gain additional use out of an agricultural tire casing after the original tread has become worn.

Agricultural tires nonetheless differ from normal passenger car tires in various ways. The most pronounced difference is the fact that agricultural tires contain large tread components that are often referred to as ribs, lugs, bars, or tread blocks. These large tread components extend radially outward from the tire carcass much farther than a typical tread pattern on a normal passenger tire.

In some known processes, these lugs are integral with the cured rubber component, and applying the cured rubber component and the lugs to the tire casing can take place in one simple step. In other known processes, the lugs are formed separately from the cured rubber component. In these processes, the cured rubber component is applied to the tire casing in one step, and the lugs are then applied to the cured rubber component in a subsequent step.

In one such process, lugs are secured to a cured rubber component using a layer often referred to as a cushion gum or cushion gum layer. This cushion gum is an uncured rubber-containing composition that, upon curing, mates the lug to cured rubber component.

In some processes, the cushion gum is applied to the back, i.e., the inside surface, of the lug. The cushion gum and lug can then be applied in combination about the circumference of the cured rubber component, which is then applied to the circumference of the tire casing, to create an uncured retreaded tire composite that is ready for curing. Typically, the uncured retreaded tire composite is then placed within a flexible rubber envelope and an airtight seal is created between the envelope and the beads of the tire to create an enveloped tire assembly. The enveloped tire assembly is then placed within a curing chamber and is subjected to pressure and heat in order to effect curing of the cushion gum.

Logistically, the lugs may be manufactured at a lug-making facility and shipped to a different facility where the new agricultural tires are made. The cushion gum may likewise be generally made at a facility distinct from the facility where the agricultural tires are made; e.g. it is prepared at the lug-making facility and shipped to the retreading facility.

In many processes, the cushion gum comprises a rubber component, a sulfur based cure system, reinforcing fillers, and other optional components. The uncured retread tire is then subjected to both heat and pressure in order to cure the cushion gum to the lug and the cured rubber component. Although limited, the shelf life of the cushion gum is relatively long because the sulfur-based cure systems require relatively high heat to be activated. Typically, the shelf life of the cushion gum is much shorter than the shelf life of the lug to which the cushion gum will eventually be secured. Furthermore, the cost of manufacturing an agricultural tire is affected by having to produce the cushion gum at a facility distinct from the facility where the agricultural tires are made. The cost of making an agricultural tire is also affected by having to apply both heat and pressure to cure the cushion gum to the lug and the cured rubber component.

A desire therefore exists to improve upon the methods for manufacturing a agricultural tire, especially in regards to the preparation of the cushion gum and the treatment of the uncured retread tire composite.

SUMMARY OF THE INVENTION

One or more embodiments of the present invention provides a method of retreading a used agricultural tire, the method comprising providing a cured rubber component having first and second planar surfaces, providing a plurality of cushion gums, where the cushion gum contains a cure system comprising a stable dinitrile oxide compound, providing a plurality of lugs, and forming an agricultural tire composite by mating the lugs to a planar surface of the cured rubber component using the cushion gums.

One or more embodiments of the present invention provides a method of manufacturing an agricultural tire, the method comprising providing a newly manufactured agricultural tire casing, providing a plurality of cushion gums, wherein each cushion gum of the plurality of cushion gums contains a cure system comprising a stable dinitrile oxide compound, providing a plurality of lugs; and forming an agricultural tire composite by mating the lugs to a planar surface of the cured rubber component using the cushion gums.

DETAILED DESCRIPTION OF ILLUSTRATIVE EMBODIMENTS

Embodiments of the present invention are based, at least in part, upon the discovery of a process of manufacturing an agricultural tire. In one or more embodiments, the process includes mating lugs to a substrate by using a cushion gum having a cure system that includes a stable dinitrile oxide compound. Because of the nature of the curing system, specifically the presence of the stable dinitrile oxide compound, the lugs can be advantageously mated to a cured rubber component (e.g., tread substrate) at ambient temperatures. Moreover, the process allows for the efficient mating of a plurality of lugs to a cured rubber component to form a useable agricultural tire.

In general, procedures for applying lugs to a tire tread substrate are known in the art as generally disclosed in U.S. Publ. No. 2014/0008005 and copending applications gaining priority from U.S. Ser. No. 61/846,591, which are incorporated herein by reference.

Application of Lugs

In one or more embodiments, the methods of the invention are employed for manufacturing a new agricultural tire. An exemplary process of the present invention may include a first step of providing a newly manufactured agricultural tire base, which is a tire that contains no lugs. This tire base, which is fully cured, may include a carcass layer as the outer layer, or may include additional outer circumferential layers such as an undertread layer or subtread layer. Practice of one or more embodiments of the invention is not necessarily limited by the cured layer to which the lugs are secured since design specs may change for any given agricultural tire. Accordingly, reference may be simply made to tread substrate to refer to the outer circumferential layer of the cured tire base to which the lugs are secured or mated. A second step includes providing a plurality of cushion gums including a stable dinitrile oxide compound. The third step includes providing a plurality of lugs, which are fully cured. The fourth step then includes securing or mating the lugs to the tread substrate by using the cushion gum as an adhesive layer. Finally, the cushion gums are allowed to cure to thereby form a new agricultural tire. As the skilled person will appreciate, the cushion gum may be first applied to the lugs to form a lug composite, and then the composite is mated to the tread substrate. Alternatively, the cushion gum is first mated to the tire substrate, and then the lug is applied or mated to the cushion gum.

In one or more embodiments, the tire substrate to which the lugs are applied includes a rubber component. The rubber component of the cushion gum composition may include natural and synthetic rubbers, which may also be referred to as elastomers. For example, the synthetic elastomers may include diene-based rubbers such as butadiene rubber, styrene-butadiene copolymer rubber, isoprene rubber, butyl rubber, halogenated butyl rubber, acrylonitrile-butadiene rubber, chloroprene rubber, styrene-isoprene-butadiene copolymer rubber, and isoprene-butadiene copolymer rubber. Other useful rubbers include ethylene-propylene-diene copolymer rubber, styrene-isoprene copolymer rubber, ethylene-propylene copolymer rubber, acrylic rubber, epichlorohydrin rubber, polysulfide rubber, silicone rubber, fluororubber, urethane rubber, and combinations thereof. These rubber components may be selected as appropriate in order to obtain high adhesiveness, depending on the content of the rubber component which makes up the newly manufactured carcass for an agricultural tire.

In one or more embodiments, the rubber component of the tread substrate is a diene-based rubber. In these or other embodiments, the rubber component of the tread substrate includes synthetic polyisoprene or natural rubber. In these or other embodiments, the tread substrate contains at least about 50 wt. %; in other embodiments at least about 70 wt. %; and in yet other embodiments at least about 80 wt. % synthetic polyisoprene or natural rubber.

The plurality of cushion gums comprises a cushion gum composition containing a rubber component, a cure system, reinforcing fillers, and other optional ingredients. The step of providing a plurality of cushion gums further includes the step of manufacturing a plurality of cushion gums. The manufacturing process may include fabricating cushion gum using a cushion gum composition. The cushion gum composition comprises a rubber component, a cure system, reinforcing fillers, and other optional ingredients.

In one or more embodiments, the rubber component of the cushion gum composition may include natural and synthetic rubbers, which may also be referred to as elastomers. For example, the synthetic elastomers may include diene-based rubbers such as butadiene rubber, styrene-butadiene copolymer rubber, isoprene rubber, butyl rubber, halogenated butyl rubber, acrylonitrile-butadiene rubber, chloroprene rubber, styrene-isoprene-butadiene copolymer rubber, and isoprene-butadiene copolymer rubber. Other useful rubbers include ethylene-propylene-diene copolymer rubber, styrene-isoprene copolymer rubber, ethylene-propylene copolymer rubber, acrylic rubber, epichlorohydrin rubber, polysulfide rubber, silicone rubber, fluororubber, urethane rubber, and combinations thereof. These rubber components may be selected as appropriate in order to obtain high adhesiveness, depending on the content of the rubber component which makes up the newly manufactured carcass for an agricultural tire.

In one or more embodiments, the rubber component of the cushion gum composition is a diene-based rubber. In these or other embodiments, the rubber component of the cushion gum composition includes synthetic polyisoprene or natural rubber. In these or other embodiments, the cushion gum composition contains at least about 50 wt. %; in other embodiments at least about 70 wt. %; and in yet other embodiments at least about 80 wt. % synthetic polyisoprene or natural rubber.

In one or more embodiments, the lugs provided contain a rubber component, and in some embodiments, the rubber component is a diene-based rubber. In these or other embodiments, the rubber component of the lugs includes synthetic polyisoprene or natural rubber. In these or other embodiments, the lugs contain at least about 50 wt. %; in other embodiments at least about 70 wt. %; and in yet other embodiments at least about 80 wt. % synthetic polyisoprene or natural rubber.

In one or more embodiments, the lugs are ultimately mated to the tread substrate by curing the cushion gum while force is applied to the lug thereby pressing the lug to the tread substrate. This may be accomplished by using a rubberized curing envelope designed for the particular agricultural tire type and size being manufactured. The envelope may be sealed to the beads of the base tire, and then the rubberized curing envelope is subjected to pressure (or vacuum). In one or more embodiments, the pressure applied is about 70 PSI to about 100 PSI relative to atmospheric, in other embodiments from about 80 PSI to about 95 PSI relative to atmospheric, and in yet other embodiments from about 85 PSI to about 90 PSI relative to atmospheric.

In other embodiments, the process of the invention includes a process for retreading an agricultural tire. An exemplary process of the present invention can be described with reference to FIG. 1, which shows a process 10 including step 12 of providing an agricultural tire casing in need of being retreaded; step 14 of providing a cured rubber component having a first and second planar surface, step 16 of providing a plurality of cushion gums, wherein the cushion gum contains a cure system comprising a stable dinitrile oxide compound; step 18 of providing a plurality of lugs; step 20 of applying the cured rubber component to the agricultural tire carcass to form an agricultural tire composite; step 22 of applying a plurality of cushion gums to the cured rubber component; step 24 of mating the plurality of lugs to the plurality of cushion gums located on the cured rubber component; and step 26 of allowing the cushion gum to cure and thereby form an agricultural tire.

Figure 1:
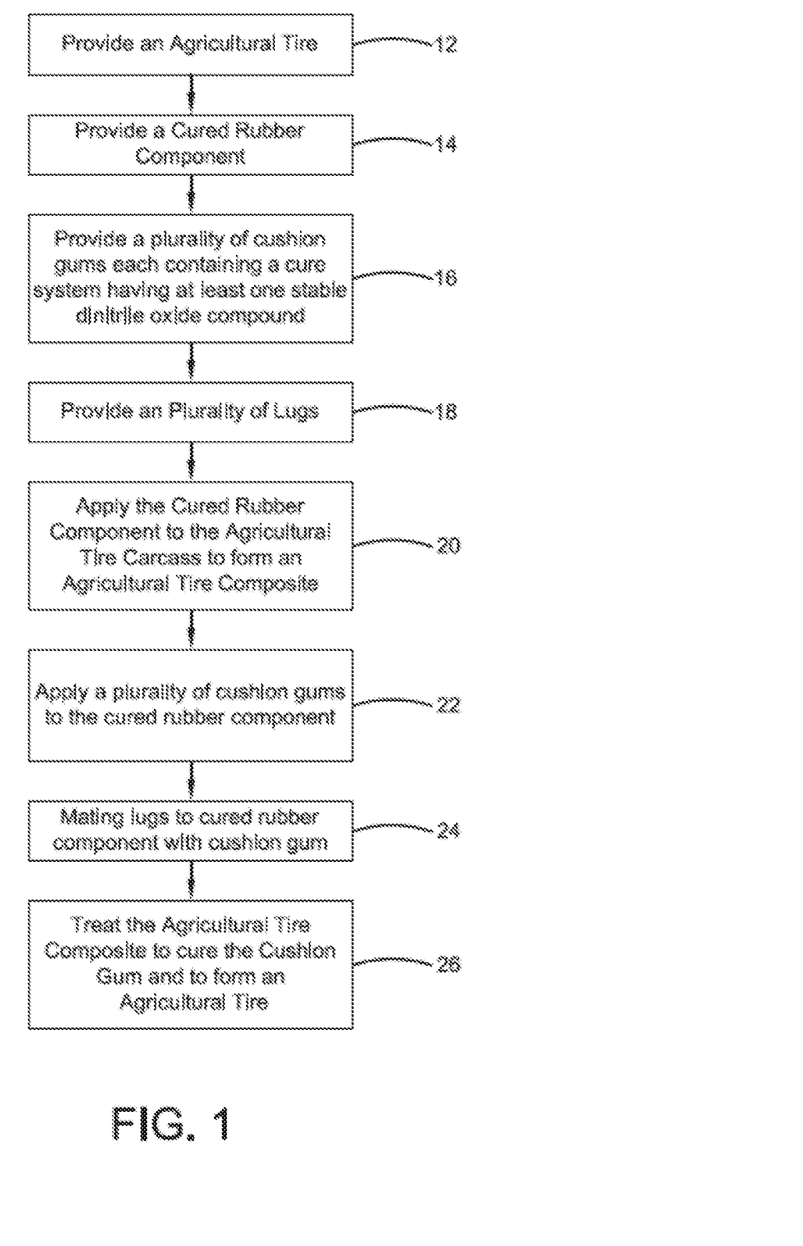
FIG. 1 is a flow chart showing the method of applying a plurality of lugs to an agricultural tire according to one or more embodiments of the invention.
Figure 2:
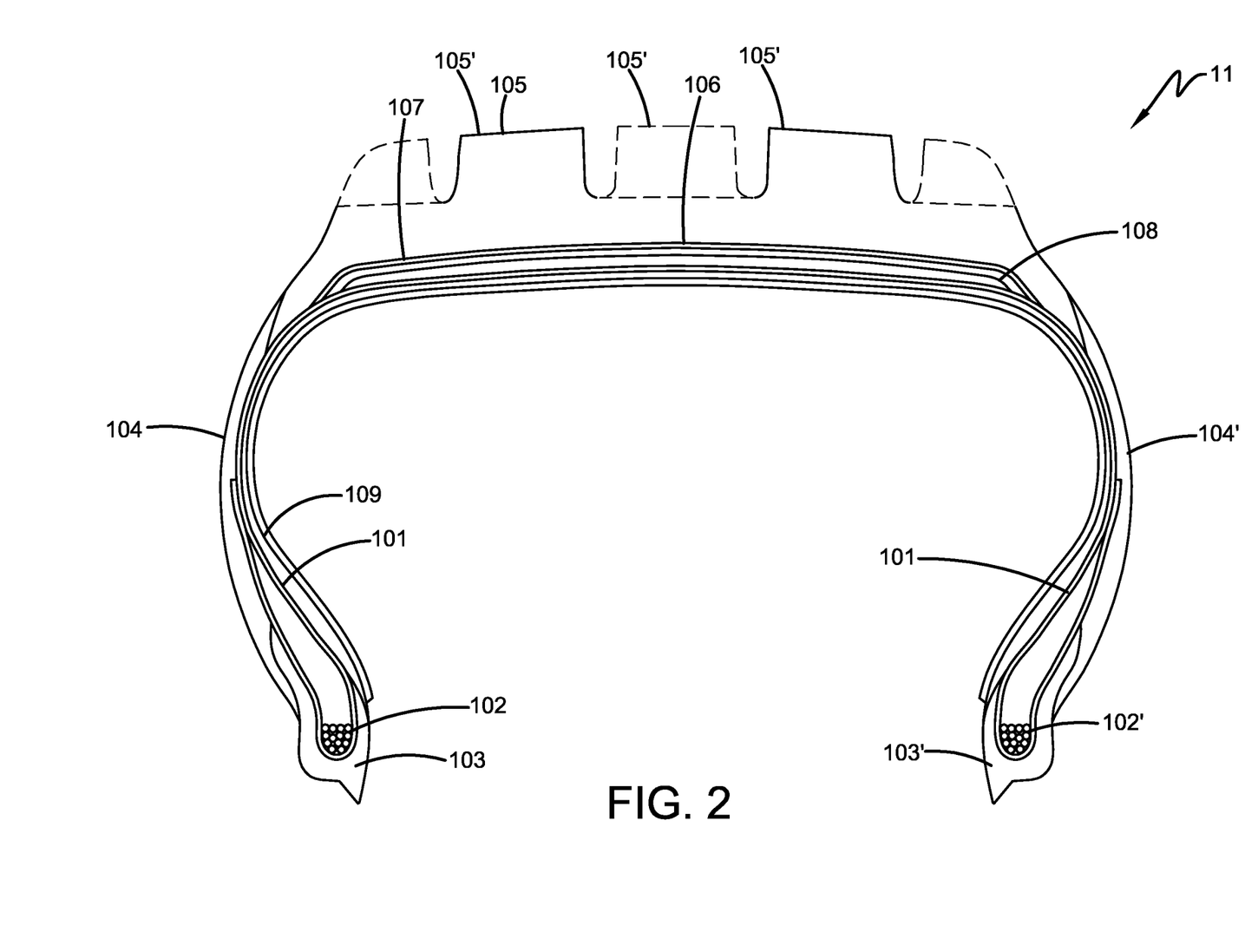
FIG. 2 is a cross-sectional view of an agricultural tire.

In one or more embodiments, step 12 of providing an agricultural tire casing includes collecting a used agricultural tire, such as the one shown in FIG. 2, wherein the used agricultural tire requires retreading. Step 12 of providing an agricultural tire casing may then include buffing the existing tread and lugs from the casing.

An exemplary agricultural tire 11 includes a carcass 101 extending between a pair of axially-spaced beads 102, 102'. Abrasion strips 103, 103' partially encase carcass 101 at or near beads 102, 102'. Agricultural tire 11 further includes opposing sidewalls 104, 104', and tread portion 105 having lugs 105', which forms the outermost circumferential surface of agricultural tire 11. Subtread 106 is disposed below tread 105, undertread 107 is disposed below subtread 106, and belt package 108 is disposed below undertread 107. Belt package 108, which may include a plurality of belts (not shown), is positioned above carcass 101, which itself may include one or more body plies (not shown). Inner liner 109 is disposed on the interior of carcass 101 relative to the tread portion 105. As the skilled person will appreciate, agricultural tire 11 may also include various other components, which are not shown, such as, but not limited to, tread shoulders, cap plies, belt wedges, and belt shoulders.

Most often the buffed surface left behind includes portions of the undertread 107, and other times the buffed surface left behind even includes portions of the subtread 106. When the tread portion 105 is removed from the agricultural tire 11, the remaining substrate may be referred to as a tire casing.

In one or more retread situations, step 12 of providing an agricultural tire casing further includes an inspection of the tire casing. This may include manual inspection such as a visual inspection and a tactile inspection. In one or more embodiments, inspection can be performed using the assistance of equipment that can perform non-destructive testing. This equipment may include, for example, X-ray.

In one or more retread situations, the tread portion 105 and the lugs 105' are removed from the agricultural tire 11 using a buffing machine, such as those machines manufactured by Bridgestone Commercial Solutions. During the buffing operation, the tread portion 105 and the lugs 105' are ground away from agricultural tire, thereby leaving a tire carcass with a buffed surface. In one or more embodiments, only the tread portion 105 and the lugs 105' are ground away from the agricultural tire 11, leaving both the subtread 106 and the undertread 107 attached to the tire casing. In other embodiments, the tread portion 105, the lugs 105', and the subtread 106 are ground away from the agricultural tire 11, leaving only the undertread 107 attached to the agricultural tire 11. The buffed surface extends circumferentially about the tire casing and also extends transversely across the outside of the outer radial wall until it terminates at the buffed shoulder areas.

In one or more retread situations, step 12 of providing a tire casing may then include treating (e.g. spraying) the tire casing with a cement in order to assist in the subsequent application of the cured rubber component. Various cements may be employed and this invention is not limited to any particular cement treatment.

In one or more retread situations, following the removal of the used tread layer, the tire casing may undergo repair. For example, the tire casing may undergo skiving and filling. Skiving is the removal of damaged material from a tire casing prior to making a repair. Often, a tire accumulates cuts, holes, nicks, or tears due to stones or other sharp objects that the tire comes in contact with during use. The injured or damaged area may be first ground smooth by an appropriate grinding tool and then filled with repair gum. It may be necessary to fill the injured areas to the level of the buffed surface to avoid air pockets between the buffed surface and the later applied cured rubber component because trapped air can have negative effects on the longevity of a typical retreaded tire.

In addition to skiving, which primarily addresses minor damage including non-penetrating injuries, the repair process may also include section repair wherein cables or other reinforcing elements of the tire carcass are repaired. Also, repair may be made to penetrating injuries. Such repair may occur by using various plugs and patches to repair punctures in the tire casing.

In one or more retread situations, the tire casing is allowed to equilibrate at ambient indoor temperature and humidity for a period of time, or in other embodiments from about 10 to 15 hours. In one or more embodiments, visible surface moisture on the tire casing is removed, and holes or other damage to the tire casing are repaired.

In one or more retread situations, step 14 includes providing a cured rubber component, wherein the cured rubber component has first and second planar surfaces. The cured rubber component contains a first planar surface and a second planar surface. In one or more embodiments, the first planar surface is a smooth surface. In these or other embodiments, the second planar surface may be a smooth surface. In one or more embodiments, practice of the present invention is not necessarily limited by the selection of the cured rubber component, which may also be referred to as a pre-cured profiled tread strip or a tread substrate. Accordingly, the step of providing a cured rubber component may rely on known techniques of the prior art. In one or more embodiments, the first planar surface of the cured rubber component may advantageously include a plurality of recesses having varying depths and/or designs. In one or more embodiments, the recesses may have a shape corresponding to the shape of the lugs that will be placed into the recesses. In one or more embodiments, the cured rubber component may be formed by methods known to those skilled in the art including, but not limited to, curing with a flat molding press. Cured rubber components useful in practice of the present invention include those described in U.S. Pat. Nos. 3,951,720, 4,075,047, 4,046,947, and 8,298,463, as well as EP 0989171, which are incorporated herein by reference.

As generally known in the art, the cured rubber component may have a first planar surface opposite a second planar surface. The first planar surface may be integral with the second planar surface to the extent that they both derive from the same extrudate, or in other embodiments the second planar surface may derive from one or more additional rubber layers mated to the first planar surface. In one or more embodiments, the first planar surface may include a plurality of recesses.

In one or more retread situations, the cured rubber component may include natural and synthetic rubbers, which may also be referred to as elastomers. For example, the synthetic elastomers may include diene-based rubbers such as butadiene rubber, styrene-butadiene copolymer rubber, isoprene rubber, butyl rubber, halogenated butyl rubber, acrylonitrile-butadiene rubber, chloroprene rubber, styrene-isoprene-butadiene copolymer rubber, and isoprene-butadiene copolymer rubber. Other useful rubbers include ethylene-propylene-diene copolymer rubber, styrene-isoprene copolymer rubber, ethylene-propylene copolymer rubber, acrylic rubber, epichlorohydrin rubber, polysulfide rubber, silicone rubber, fluororubber, urethane rubber, and combinations thereof.

In one or more retread situations, the cured rubber component is a diene-based rubber. In these or other embodiments, the cured rubber component includes synthetic polyisoporene or natural rubber. In these or other embodiments, the cured rubber component contains at least about 50 wt. %; in other embodiments at least about 70 wt. %; and in yet other embodiments at least about 80 wt. % synthetic polyisoprene or natural rubber.

In one or more retread situations, step 16 includes providing a plurality of cushion gums, wherein each cushion gum containing a stable dinitrile oxide compound. The cushion gum comprises a cushion gum composition containing a rubber component, a cure system, reinforcing fillers, and other optional ingredients.

In one or more retread situations, step 16 of providing a plurality of cushion gums includes the step of manufacturing a plurality of cushion gums. The manufacturing process may include fabricating cushion gum using a cushion gum composition.

The manufacturing process for the plurality of cushion gums is not particularly limited, and may be selected as appropriate depending upon the application thereof. In one or more embodiments, cushion gum may be manufactured by forming a sheet using a rolling roll or by extrusion techniques.

The shape of the cushion gums is not particularly limited, and may be selected as appropriate depending on the application thereof. Regardless of what process is used to manufacture the plurality of cushion gums, the process to prepare cushion gum may take place at the same location in which the process for applying the lugs to the agricultural tire takes place because the cure system in the cushion gum composition has a limited shelf life. That shelf life is defined as the time it takes for cushion gum to loss its tack, or its ability to adhere to both the lug and the cured rubber component. The shelf life of cushion gum begins at the time the cushion gum composition is formed and ends when the cushion gum loses its tack.

In one embodiment, the cushion gum is manufactured by extrusion. The cushion gum composition is extruded through an extruder to form a cushion gum extrudate. The cushion gum extrudate may then be applied the cured rubber component. In another embodiment, the cushion gum composition is extruded directly on to the cured rubber component. In yet other embodiments, the gum cushion is extruded directly onto the lugs. In still other embodiments, the cushion gum is prepared by calendaring.

In one or more embodiments, the rubber component of the cushion gum composition may include natural and synthetic rubbers, which may also be referred to as elastomers. For example, the synthetic elastomers may include diene-based rubbers such as butadiene rubber, styrene-butadiene copolymer rubber, isoprene rubber, butyl rubber, halogenated butyl rubber, acrylonitrile-butadiene rubber, chloroprene rubber, styrene-isoprene-butadiene copolymer rubber, and isoprene-butadiene copolymer rubber. Other useful rubbers include ethylene-propylene-diene copolymer rubber, styrene-isoprene copolymer rubber, ethylene-propylene copolymer rubber, acrylic rubber, epichlorohydrin rubber, polysulfide rubber, silicone rubber, fluororubber, urethane rubber, and combinations thereof. These rubber components may be selected as appropriate in order to obtain high adhesiveness, depending on the content of the rubber component which make up the cured rubber component and the rubber component which make up the tire casing.

In one or more embodiments, the rubber component of the cushion gum composition is a diene-based rubber. In these or other embodiments, the rubber component of the cushion gum composition includes synthetic polyisoprene or natural rubber. In these or other embodiments, the cushion gum composition contains at least about 50 wt. %; in other embodiments at least about 70 wt. %; and in yet other embodiments at least about 80 wt. % synthetic polyisoprene or natural rubber.

In one or more embodiments, the cure system of the cushion gum composition comprises at least one nitrile oxide compound, such as a stable dinitrile oxide compound. There are relatively few chemical reactions know that can modify a diene rubber selectively and at an ambient temperature the way nitrile oxides can. Dinitrile oxides are extremely reactive toward double bonds, including the carbon-carbon double bonds in rubbers. Because of this extreme reactivity, dinitrile oxides can be employed as curing (crosslinking) agents for rubbers.

Practice of one or more embodiments of the present invention is not necessarily limited by the method of producing the stable dinitrile oxide compound. Accordingly, the stable dinitrile oxide compound is produced by various known methods, such as those methods taught by U.S. Patent Application No. 2012/0196976 and U.S. Pat. No. 6,355,826, both of which are incorporated herein by reference.

In one embodiment, the stable dinitrile oxide compound is a stable aryl dinitrile oxide compound. In one embodiment, the stable aryl dinitrile is selected from the group consisting of mesitylene dinitrile oxide (MDNO) and bismesitylene dinitrile oxide (BMNO).

In one or more embodiments, the reinforcing filler of the cushion gum composition may include carbon black, inorganic fillers, and/or combinations thereof. The content of the reinforcing filler is not particularly limited, and may be selected as appropriate depending on the application thereof.

In one or more embodiments, the reinforcing filler is an inorganic filler. The inorganic filler is not particularly limited, and may be selected as appropriate depending on the application thereof. In one embodiment, the inorganic filler is selected from the group consisting of silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, barium sulfate, and combinations thereof. In some embodiments, when using an inorganic filler, a silane coupling agent may be used as appropriate.

In one or more embodiments, the reinforcing filler is carbon black. The carbon black may be selected as appropriate depending on the application thereof. In one embodiment, the carbon black is selected from the group consisting of carbon black of HAF, FF, FEF, GPF, SRF, FT grades, and combinations thereof.

In one or more embodiments, the cushion gum composition comprises other components when necessary. In one embodiment, the other components are selected from the group consisting of a tackifier, a reinforcing agent, a softening agent, a filler, a vulcanizing aid, a colorant, a flame retardant, a lubricant, a foaming agent, a plasticizer, a processing aid, an antioxidant, an age resister, an ultraviolet rays protecting agent, an antistatic agent, a color protecting agent, and combinations thereof.

In one or more embodiments, the cushion gum composition may include from about 10 to about 120 parts by weight filler per 100 parts by weight rubber, in other embodiments from about 20 to about 100 parts by weight filler per 100 parts by weight rubber, and in other embodiments from about 30 to about 80 parts by weight filler per 100 parts by weight rubber.

In one or more embodiments, the cushion gum composition may include from about 1 to about 20 parts by weight dinitrile oxide per 100 parts by weight rubber, in other embodiments from about 2 to about 15 parts by weight dinitrile oxide per 100 parts by weight rubber, and in other embodiments from about 5 to about 10 parts by weight dinitrile oxide per 100 parts by weight rubber.

In one embodiment, the content of the stable aryl dinitrile compound is between 1 and 20 phr, parts by weight per hundred parts of the rubber component of the cushion gum composition, preferably between 2 and 15 phr, and more preferably between 5 and 10 phr.

The content thereof per 100 parts by mass of the rubber component of the cushion gum composition is preferably 10 parts by mass to 80 parts by mass, more preferably 25 parts by mass to 50 parts by mass, and particularly preferably 30 parts by mass to 40 parts by mass.

The content of the carbon black per 100 parts by mass of the rubber component of the cushion gum composition is not particularly limited, and may be selected as appropriate depending on the application thereof. The content thereof is preferably 25 parts by mass to 50 parts by mass, and more preferably 30 parts by mass to 40 parts by mass.

If the content of the carbon black per 100 parts by mass of the rubber component is less than 25 parts by mass, sufficient reinforcing effect may not be obtained, and if the content thereof exceeds 50 parts by mass, the rubber composition may become too hard.

In one or more embodiments, the cushion gum composition comprises other components when necessary. In one embodiment, the other components are selected from the group consisting of a tackifier, a reinforcing agent, a softening agent, a filler, a vulcanizing aid, a colorant, a flame retardant, a lubricant, a foaming agent, a plasticizer, a processing aid, an antioxidant, an age resister, an ultraviolet rays protecting agent, an antistatic agent, a color protecting agent, and combinations thereof.

In one or more retread situations, step 18 includes providing a plurality of lugs. In one or more embodiments, step 18 includes providing cured lugs. In one or more embodiments, the rubber component of the lugs is a diene-based rubber. In these or other embodiments, the rubber component of the lugs includes synthetic polyisoprene or natural rubber. In these or other embodiments, the lugs contain at least about 50 wt. %; in other embodiments at least about 70 wt. %; and in yet other embodiments at least about 80 wt. % synthetic polyisoprene or natural rubber.

In one or more embodiments, the lugs are sulfur cured. In other embodiments, the lugs are cured using a stabile dinitrile oxide as described herein. In one or more embodiments, the lugs have a substantially rectangular cross section. In an alternative embodiment, the lugs have a trapezoidal cross-section. In another alternative embodiment the lugs have curved sides. In another alternative embodiment, the cross-section of the lugs may be of any geometric shape.

Each lug of the plurality of lugs has a top surface and a bottom surface. Each lug has a lug height which represents the distance between top surface and the bottom surface of the lug. Each lug may be defined by a lug angle that represents the average inclination of the lug with respect to the cured rubber component's equatorial plane.

In one embodiment, the lugs are extruded, and then cut to a desired length. In an alternative embodiment, the lugs are molded. In another alternative embodiment, the lugs are formed by a 3-D printing or additive manufacturing process. In other alternative embodiments, the lugs may be formed by any known process.

In one particular embodiment, the lugs are skid lugs. In this embodiment, the height of each skid lug is approximately 6% of the tire's width. In additional embodiments, the height of each skid lug is between 3-8% or 4-7% of the tire's width. In further embodiments, the height of each skid lug is between 6-18% of the tire's width. However, it should be understood that the skid lugs may have any height.

In an alternative embodiment, the lugs are deep skid lugs. In this embodiment, the height of each deep skid lug is approximately 8% of the tire's width. In additional embodiments, the height of each deep skid lug is between 5-20% of the tire's width. In further embodiments, the height of each deep skid lug is between 6-22% of the tire's width. However, it should be understood that the deep skid lugs may have any height.

In an alternative embodiment, the lugs are skid lugs for use on a relatively narrow agricultural tire. In this embodiment, the height of each skid lug for use on a relatively narrow agricultural tire is approximately 14% of the tire's width. In additional embodiments, the height of each skid lug for use on a relatively narrow agricultural tire is between 10-17% of the tire's width. In further embodiments, the height of each skid lug for use on a relatively narrow agricultural tire is between 12-19% or 20-35% of the tire's width. However, it should be understood that the skid lugs for use on a relatively narrow agricultural tire may have any height.

As one of ordinary skill in the art would recognize, the lugs may be used in agricultural tire constructions designated as R1, R1W, and R2 constructions, where R1 corresponds to a standard skid depth (Tire & Rim Association Standard AG-09-21), R1W corresponds to a skid depth that is 20% deeper than R1, and R2 corresponds to a skid depth that is 200% of R1. Additional examples of tires utilizing skids include, without limitation, drive wheels for agricultural vehicles, irrigation tires, forestry tires, floatation tires, combine tires, tractor tires, mining tires, construction tires, sprayer tires, and off-the-road vehicles.

In one embodiment, the lugs are arranged to provide a mono-pitch noise-sequenced tread. In an alternative embodiment, the lugs are modulated to provide a bi-pitch noise-sequenced tread. In yet another embodiment, the lugs are modulated to provide a multi-pitch noise-sequenced tread.

In one or more retread situations, step 20 includes applying the cured rubber component to the agricultural tire casing to form an agricultural tire composite. Practice of one or more embodiments of the present invention is not necessarily limited by the method of applying the cured rubber component to the agricultural tire casing. However, one such method comprises providing a second cushion gum, wherein the second cushion gum contains a cure system comprising at least one stable dinitrile oxide compound; applying the second cushion gum to the agricultural tire casing; and applying the second planar surface of the cured rubber component to the second cushion gum.

In one or more retread situations, step 22 includes applying the plurality of cushion gums to the cured rubber component. In this or other embodiments, said step of applying the plurality of cushion gums to the cured rubber component further may include applying a layer of unheated cushion gum directly to the cured rubber component. Typically, each cushion gum is cut transversely, and the cut edge is spliced with the leading edge so there is no gap between the beginning and the end each cushion gum.

In one or more retread situations, the cushion gum is extruded directly onto the cured rubber component at a position where a lug is desired. In other embodiments, the cushion gum is extruded directly onto the lug. In other embodiments, the cushion gum is extruded onto a transfer film, and then the transfer film is used to apply the extrudate directly to the cured rubber component, before an appreciable amount of curing takes place, and the transfer film is then removed.

In one or more retread situations, each cushion gum may be applied over the cured rubber component and trimmed to size. The resulting "cushioned" cured rubber component is then paired with a lug and is then subjected to a treatment, as described later.

In certain retread situations, after each cushion gum is applied the cured rubber component, a layer is stitched, or in other words pressed, against each applied cushion to drive out any air trapped between the cushion gum and the cured rubber component. Following stitching, if a top layer of plastic is present over the cushion gum, the top layer of plastic is removed from the cushion gum to permit a lug to later be applied over the cushion gum.

In one or more retread situations, step 24 includes applying a lug to each cushion gum that has been applied to the cured rubber component. In one or more embodiments, step 24 includes applying the bottom surface of each lug against the exposed portion of each cushion gum. In one or more embodiments, each lug is also applied with the assistance of a building machine that differs from the building machine used to apply each cushion gum. When using a building machine, each lug may be guided onto the cured rubber component against each cushion gum by guide rollers.

In one or more retread situations, step 26 includes treating the untreated agricultural tire composite to cure each cushion gum and to form a retread agricultural tire. In one or more embodiments, said step of treating the untreated agricultural tire composite to cure each cushion gum further may include encasing the agricultural tire composite in an envelope.

In one or more embodiments, after application of the cured rubber component, the application of each cushion gum onto the cured rubber component, and the application of the lugs, the untreated agricultural tire composite is ready for treatment under appropriate temperature and pressure conditions. In one or more retread situations, step 26 of treating the untreated agricultural tire composite includes placing the untreated agricultural tire composite into a rubberized curing envelope designed for the particular agricultural tire type and size being retreaded. The envelope is sealed to the beads of the untreated agricultural tire casing. The rubberized curing envelope is then subjected to pressure so as to ensure that the lugs conform to the cured rubber component. In one or more embodiments, the pressure applied is about 70 PSI to about 100 PSI relative to atmospheric, in other embodiments from about 80 PSI to about 95 PSI relative to atmospheric, and in yet other embodiments from about 85 PSI to about 90 PSI relative to atmospheric.

In one or more retread situations, step 26 of treating the tire composite takes places at an ambient operating temperature. In one or more embodiments, the operating temperature is between about 10° C. and about 60° C., in other embodiments between about 15° C. and about 50° C., and in yet other embodiments between about 18° C. and about 45° C.

The time required or desired to treat the tire composite will depend on the treatment conditions. After the treatment is complete, the pressure on the curing envelope is returned to atmospheric, and a fully functional retread tire is formed.

Practice of one or more embodiments of the present invention is not necessarily limited by the particular type of rubberized curing envelope used. Accordingly, the known types of rubberized curing envelopes are used, such as those envelopes taught by U.S. Patent Application No. 2014/0008005, which is incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A method of retreading a used agricultural tire, the method comprising:
   (i) providing a used agricultural tire casing from the used agricultural tire;
   (ii) providing a cured rubber component having first and second planar surfaces;
   (iii) providing a plurality of lug cushion gums by directly extruding a composition for forming the plurality of lug cushion gums onto the first surface of the cured rubber component, wherein each lug cushion gum of the plurality of lug cushion gums contains a cure system comprising a stable dinitrile oxide compound, and where each lug cushion gum of the plurality of lug cushion gums includes first and second surfaces;
   (iv) providing a plurality of lugs having a mating surface;
   (v) mating the lugs to the cured rubber component by mating the first surface of the plurality of lug cushion gums to the mating surface of the plurality of lugs, respectively, and mating the second surface of the plurality of lug cushion gums to the first surface of the cured rubber component;
   (vi) providing a casing cushion gum for mating the cured rubber component to the tire casing, wherein the casing cushion gum contains a cure system comprising a stable dinitrile oxide compound, and wherein the casing cushion gum including first and second surfaces;
   (vii) mating the cured rubber component to the used agricultural tire casing by mating the first surface of the casing cushion gum to the tire casing and mating the second surface of the casing cushion gum to the second surface of the cured rubber component to thereby form a pre-cured re-treaded agricultural tire;
   (viii) encasing the pre-cured re-treaded agricultural tire in an envelope;
   (ix) placing the enveloped pre-cured re-treaded agricultural tire in a pressure chamber; and
   (x) applying pressure to the enveloped pre-cured re-treaded agricultural tire and allowing the plurality of lug cushion gums and the casing cushion gum to cure and thereby form a re-treaded agricultural tire.

2. The method of claim 1, wherein the lugs contain at least about 50 wt. % synthetic polyisoprene or natural rubber.

3. The method of claim 1, wherein the first surface of the cured rubber component includes a plurality of recesses, and said step of mating the lugs to the cured rubber component includes aligning the plurality of lugs with the plurality of recesses.

4. The method of claim 1, wherein the cured rubber component contains at least about 50 wt. % synthetic polyisoprene or natural rubber.

5. The method of claim 1, wherein the stable dinitrile oxide compound in the cure system of each lug cushion gum of the plurality of lug cushion gums and in the cure system of the casing cushion gum is a stable aryl dinitrile oxide.

6. The method of claim 5, wherein the stable aryl dinitrile oxide is selected from the group consisting of mesitylene dinitrile oxide (MDNO) and bismesitylene dinitrile oxide (BMNO).

7. The method of claim 1, wherein the plurality of cushion gums contains at least about 50 wt. % synthetic polyisoprene or natural rubber.

8. The method of claim 1, where said encasing the pre-cured re-treaded agricultural tire in an envelope; said placing the enveloped pre-cured re-treaded agricultural tire in a pressure chamber; and said applying pressure to the enveloped pre-cured re-treaded agricultural tire and allowing the plurality of lug cushion gums and the casing cushion gum to cure and thereby form a re-treaded agricultural tire takes place at a temperature between about 10° C. and about 60° C.

9. The method of claim 1, wherein said step of mating the lugs to the cured rubber component and said step of mating the cured rubber component to the casing takes place at a location, and wherein the plurality of lug cushion gums are prepared at the same location in which said mating the lugs to the cured rubber component takes place, and wherein said casing cushion gum is prepared at the same location in which said mating the cured rubber component to the tire casing takes place.

10. The method of claim 1, wherein said step of providing an agricultural tire casing comprises buffing used lugs from the used agricultural tire.

11. The method of claim 10, wherein said step of providing an agricultural tire casing further includes buffing sub-tread from the used agricultural tire.

12. The method of claim 1, where said mating the cured rubber component to the tire casing includes directly extruding a composition for forming the casing cushion gum onto the tire casing or onto the second surface of the cured rubber component.

\* \* \* \* \*